US011019839B2

(12) United States Patent
Shi et al.

(10) Patent No.: US 11,019,839 B2
(45) Date of Patent: Jun. 1, 2021

(54) COFFEE ROASTING APPARATUS, COFFEE BREWING APPARATUS AND COFFEE ROASTING METHOD

(71) Applicant: KONINKLIJKE PHILIPS N.V., Eindhoven (NL)

(72) Inventors: Jun Shi, Eindhoven (NL); Jingwei Tan, Eindhoven (NL); Jun Zhou, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 286 days.

(21) Appl. No.: 15/519,169

(22) PCT Filed: Oct. 15, 2015

(86) PCT No.: PCT/IB2015/057917
§ 371 (c)(1),
(2) Date: Apr. 14, 2017

(87) PCT Pub. No.: WO2016/063177
PCT Pub. Date: Apr. 28, 2016

(65) Prior Publication Data
US 2017/0238593 A1 Aug. 24, 2017

(30) Foreign Application Priority Data

Oct. 22, 2014 (WO) ................ PCT/CN2014/089141

(51) Int. Cl.
*A23N 12/08* (2006.01)
*A23F 5/04* (2006.01)
(Continued)

(52) U.S. Cl.
CPC ................ *A23N 12/08* (2013.01); *A23F 5/04* (2013.01); *A23N 12/125* (2013.01); *A47J 31/42* (2013.01)

(58) Field of Classification Search
None
See application file for complete search history.

(56) References Cited

U.S. PATENT DOCUMENTS 3,964,175 A * 6/1976 Sivetz ..................... A23F 5/046
34/589
4,325,191 A 4/1982 Kumagai et al.
(Continued)

FOREIGN PATENT DOCUMENTS

CN 1278705 A 1/2001
CN 1098036 C 1/2003
(Continued)

OTHER PUBLICATIONS

"Progress on Coffee roasting a process control tool for a consistent Roast degree roast after roast", Chahan Yeretzian, Flurin Wieland & Alexia N. Gloess Marco Keller, Andreas Wetzel & Stefan Schenker, pp. 22-26, Newfood, vol. 15, Issue 3, 2012.
(Continued)

*Primary Examiner* — Ibrahime A Abraham
*Assistant Examiner* — Gyounghyun Bae
(74) *Attorney, Agent, or Firm* — Schott, P.C.

(57) ABSTRACT

A coffee roasting apparatus is disclosed comprising a compartment for holding coffee beans, a heating arrangement for heating the coffee beans in the compartment during a roasting process of the coffee beans, a volatile organic compound sensor for determining a total concentration of volatile organic compounds residing in the compartment, and a controller for controlling the heating arrangement. The controller is adapted to determine whether a rate of change in the total concentration of volatile organic compounds exceeds a predefined threshold and control the heating arrangement based on a determination that the rate of change in the total concentration of volatile organic compounds exceeds the predefined threshold. A coffee brewing appara-
(Continued)

tus including such a coffee roasting apparatus and a coffee roasting method are also disclosed.

11 Claims, 3 Drawing Sheets

(51) Int. Cl.
*A23N 12/12* (2006.01)
*A47J 31/42* (2006.01)

(56) References Cited

U.S. PATENT DOCUMENTS

| | | | | | |
|---|---|---|---|---|---|
| 4,335,149 | A | * | 6/1982 | Stipp | A23L 27/70 426/312 |
| 4,425,720 | A | * | 1/1984 | Elevitch | A23N 12/08 219/386 |
| 4,479,176 | A | * | 10/1984 | Grimshaw | G05B 13/025 700/28 |
| 4,748,030 | A | * | 5/1988 | Illy | A23F 5/105 426/233 |
| 4,988,590 | A | * | 1/1991 | Price | A23F 5/046 426/467 |
| 4,991,312 | A | * | 2/1991 | Pambianchi | D06F 43/00 34/534 |
| 5,160,757 | A | * | 11/1992 | Kirkpatrick | A23F 5/02 426/466 |
| 5,227,188 | A | * | 7/1993 | Leppla | A23F 5/12 426/388 |
| 5,257,574 | A | * | 11/1993 | Hiromichi | A23N 12/12 126/21 A |
| 5,359,788 | A | * | 11/1994 | Gell, Jr. | A23N 12/083 219/502 |
| 5,387,256 | A | * | 2/1995 | Enomoto | A47J 31/42 34/233 |
| 5,394,623 | A | | 3/1995 | Sewell | |
| 5,558,797 | A | * | 9/1996 | Takagi | H05B 6/6411 219/705 |
| 5,981,917 | A | * | 11/1999 | Groth | B22D 41/015 219/421 |
| 6,053,093 | A | * | 4/2000 | Gerhardt | A23N 12/08 34/233 |
| 6,106,877 | A | * | 8/2000 | Allington | A23F 5/04 426/233 |
| 6,339,985 | B1 | * | 1/2002 | Whitney | A47J 31/061 99/286 |
| 7,750,271 | B2 | * | 7/2010 | Smith | F24C 7/08 219/391 |
| 7,892,587 | B2 | * | 2/2011 | Norton | A23F 5/46 426/534 |
| 8,435,579 | B2 | * | 5/2013 | Smyth | A23B 9/30 426/93 |
| 8,524,307 | B2 | * | 9/2013 | Bytof | A23F 5/046 426/594 |
| 9,545,169 | B2 | * | 1/2017 | Stordy | A23F 5/02 |
| 2002/0155210 | A1 | * | 10/2002 | Hardesty | A23F 5/243 426/594 |
| 2014/0242239 | A1 | | 8/2014 | Boggavarapu | |
| 2014/0314921 | A1 | * | 10/2014 | Kuempel | H04L 67/10 426/231 |
| 2014/0314923 | A1 | * | 10/2014 | Sewell | A23N 12/08 426/233 |

FOREIGN PATENT DOCUMENTS

| | | |
|---|---|---|
| CN | 101548852 A | 10/2009 |
| CN | 201892841 U | 7/2011 |
| CN | 103313613 A | 9/2013 |
| CN | 104686650 A | 6/2015 |
| EP | 1041891 A1 | 10/2000 |
| EP | 1041891 B1 | 9/2007 |
| JP | 2001-522593 A | 11/2001 |
| JP | 2009-125252 A | 6/2009 |
| RU | 2080796 C1 | 6/1997 |
| SU | 139556 A1 | 11/1961 |
| WO | 9923888 A1 | 5/1999 |
| WO | 02/44698 A1 | 6/2002 |
| WO | 0244598 A2 | 6/2002 |
| WO | 2014141619 A1 | 9/2014 |

OTHER PUBLICATIONS

"Online monitoring of coffee roasting by proton transfer time-of-flight mass spectrometry (PTR-ToF-MS): towards a real-time process control for a consistent roast profile", Flurin Wieland & Alexia N. Gloess & Marco Keller & Andreas Wetzel, Anal Bioanal Chem (2012) 402:2531-2543.

"Release Kinetics of Volatile Organic Compounds from Roasted and Ground Coffee: Online Measurements by PTR-MS and Mathematical Modeling", Maria-L. Mateus,*,† Christian Lindinger,§ Jean-C. Gumy,† and Remy, Journal of Agricultural and food chemistry, 2007, 55, 10117-10128.

"From the green bean to the cup of coffee investigating coffee roasting by on-line monitoring of volatiles", Chahan Yeretzian • Alfons Jordan • Raphael Badoud, Werner Linding, Eur Food Res Technol, 2002, 214:92-104.

"The Detection of Volatile Organic Compounds in Instant Pre-Mixed Coffee by Using Head Space Solid Phase Micro Extraction With Gas Chromatography and Mass Spectrometry", Shahrir Hafizi Bin Hashim, Nov. 30, 2010, pp. 1-24.

Office Action issued in connection with corresponding 201580070410. 6, dated Jan. 4, 2019, 15 pages.

Notice of Allowance issued in connection with corresponding 2017117550, dated Apr. 23, 2019, 21 pages.

\* cited by examiner

COFFEE ROASTING APPARATUS, COFFEE BREWING APPARATUS AND COFFEE ROASTING METHOD

This application is the U.S. National Phase application under 35 U.S.C. § 371 of International Application No. PCT/IB2015/057917, filed on Oct. 15, 2015, which claims the benefit of International Application No. PCT/CN2014/089141 filed on Oct. 22, 2014. These applications are hereby incorporated by reference herein.

FIELD OF THE INVENTION

The present invention relates to a coffee roasting apparatus comprising a compartment for holding coffee beans; a roasting element for roasting the coffee beans in said compartment; and a controller for controlling the roasting element.

The present invention further relates to a coffee brewing apparatus comprising such a coffee roasting apparatus.

The present invention yet further relates to a method of roasting coffee beans, the method comprising heating the coffee beans to roast the coffee beans.

BACKGROUND OF THE INVENTION

Coffee has become one of the most popular beverages in modern society, with many different types and flavours of coffee being routinely available to a consumer, either in outlets such as coffee shops or in supermarkets for domestic use. The evolution of the popularity of coffee as a beverage has caused a shift in how coffee is being consumed, for instance in domestic settings.

Whereas in the past coffee would be predominantly brewed from instant coffee granules or from packaged ground coffee powders, e.g. using domestic coffee makers such as espresso machines or filter machines, nowadays a greater emphasis is placed on the freshness of the brewed coffee, which has triggered a rise in popularity of coffee roasting apparatuses. In such an apparatus, fresh, i.e. green, coffee beans can be roasted by a thermal process, e.g. using hot gases or by physical contact with a hot surface. During roasting at temperatures above 170° C., water is redistributed, and complex chemical reactions such as Maillard reaction and pyrolysis are induced. A fresh coffee powder can then be formed by grinding the freshly roasted coffee beans, thereby facilitating the brewing of fresh coffee. Such coffee is typically considered to have a superior taste compared to coffee brewed from packaged ground coffee powders.

The control of such a coffee roasting process is however far from trivial. Different users may require a different degree of roasting, e.g. a light roast or dark roast, of the coffee beans to cater for their personal taste. Moreover, different varieties of coffee beans will require different roasting times in order to achieve a certain roasting degree. Indeed, even different harvests of the same variety of coffee beans may exhibit variability in the required roasting times to achieve the desired degree of roasting. Therefore, one of the major challenges in providing a coffee roasting apparatus is to ensure that the roasted product meets customer expectation; e.g. has the desired degree of roasting.

Existing coffee roasting apparatuses such as the Nesco® Model CR-1000 Series of coffee roasters allow the user to specify the roasting time of the coffee beans in order to achieve the desired roasting result. Other roasting apparatuses offer control over the roasting process by allowing the user to specify the roasting temperature. However, as indicated above, it has been found that the desired roasting degree cannot be consistently achieved by (only) controlling the roasting time and/or temperature.

SUMMARY OF THE INVENTION

The present invention seeks to provide a coffee roasting apparatus that may produce roasted coffee beans in a more consistent manner.

The present invention further seeks to provide a coffee brewing apparatus comprising such a coffee roasting apparatus.

The present invention yet further seeks to provide a method of roasting coffee beans in a more consistent manner.

According to an aspect, there is provided a coffee roasting apparatus comprising a compartment for holding coffee beans; a roasting element for roasting the coffee beans in said compartment; and a controller for controlling the roasting element, wherein the controller is adapted to control the roasting element as a function of a rate of change in the total concentration of volatile organic compounds (VOCs) residing in the compartment.

The inventors have realized that in a coffee roasting process the variability in the time required to achieve the desired level of roasting is related to the variability in the time of first cracking of the coffee beans. This first cracking occurs as a result of heat-induced changes to the coffee bean structure including pore formation within the coffee bean, which is associated with a significant increase in the rate of release of VOCs from the coffee beans, leading to a rapid increase in the total concentration of VOCs within the compartment. After first cracking, the further roasting of the coffee bean has been found to be highly predictable using simple mathematical models. Therefore, by monitoring the rate changes in the concentration of VOCs and associating these changes with the first cracking of the coffee beans, improved control over the reproducibility of the coffee roasting process within the coffee roasting apparatus of the present invention is achieved.

In an embodiment, the coffee roasting apparatus further comprises a sensor for determining said total concentration, wherein the controller is adapted to control the roasting element in response to the sensor. The controller may be arranged to determine the rate of change of said total concentration from the sensor readings provided by this sensor.

The controller may be responsive to said rate of change exceeding a predefined threshold. Such a rate of change exceeding the predefined threshold may be indicative of the start of a first cracking phase of said coffee beans.

Alternatively or additionally, the rate of change exceeding a predefined threshold may be further indicative of the end of a first cracking phase of said coffee beans. Upon the completion of the first cracking phase, a negative rate of change in the total concentration of the VOCs is typically experienced as the total VOC concentration becomes more or less constant for a period of time between first and second cracking.

Alternatively or additionally, the rate of change exceeding a predefined threshold may be further indicative of the start of a second cracking phase of said coffee beans, when a positive rate of change in the total concentration of the VOCs is typically experienced as the total VOC concentration increases again. This for instance may be used as a reference point if a deep roast of the coffee beans is required.

The controller is typically adapted to control the roasting process in a predetermined manner after said rate of change exceeding the predefined threshold. Such a predetermined manner may include applying a predetermined roasting control profile to the heating element, e.g. based on the aforementioned simple mathematical models, to control the remainder of the roasting process in a predetermined manner. This for instance may include enabling the roasting element for a predefined time period.

The coffee roasting apparatus may further comprise a timer, wherein the controller is responsive to said timer for enabling the roasting element for the predefined time period. The timer may be separate to the controller or may form part of the controller.

The coffee roasting apparatus may further comprise a user interface for defining a degree of roasting of the coffee beans, the controller being responsive to the user interface. This allows a user of the coffee roasting apparatus to precisely define the desired degree of roasting of the coffee beans.

In an embodiment, the compartment comprises an inlet; and the roasting element comprises a hot air source coupled to said inlet; the coffee roasting apparatus further comprising a stirring element mounted in said compartment for stirring the coffee beans during the roasting process. Such a hot air roasting process has been found particularly effective when combined with the VOC concentration rate change detection principle of the present invention.

In accordance with another aspect, there is provided a coffee brewing apparatus including the coffee roasting apparatus according to one or more of the aforementioned embodiments. Such a coffee brewing apparatus benefits from the improved consistency of the coffee roasting apparatus, thereby providing a coffee brewing apparatus that can brew coffee with an improved consistency in taste.

According to yet another aspect, there is provided a method of roasting coffee beans in a compartment of a coffee roasting apparatus, the method comprising heating the coffee beans to roast the coffee beans; monitoring a rate of change in the total concentration of volatile organic compounds in said compartment; and controlling said heating as a function of the monitored rate of change. Such a roasting method is capable of producing roasted coffee beans in a particularly consistent manner, providing excellent control over the level of roasting of the coffee beans.

In an embodiment, said monitoring comprises detecting said rate of change exceeding a predefined threshold; and said controlling comprises controlling said heating for a predefined time period after detecting said rate of change exceeding the predefined threshold.

The predefined threshold may be indicative of the start of a first cracking phase of said coffee beans; and/or the end of a first cracking phase of said coffee beans; and/or the start of a second cracking phase of said coffee beans.

BRIEF DESCRIPTION OF THE DRAWINGS

Embodiments of the invention are described in more detail and by way of non-limiting examples with reference to the accompanying drawings, wherein.

DETAILED DESCRIPTION OF THE EMBODIMENTS

Figure 1:
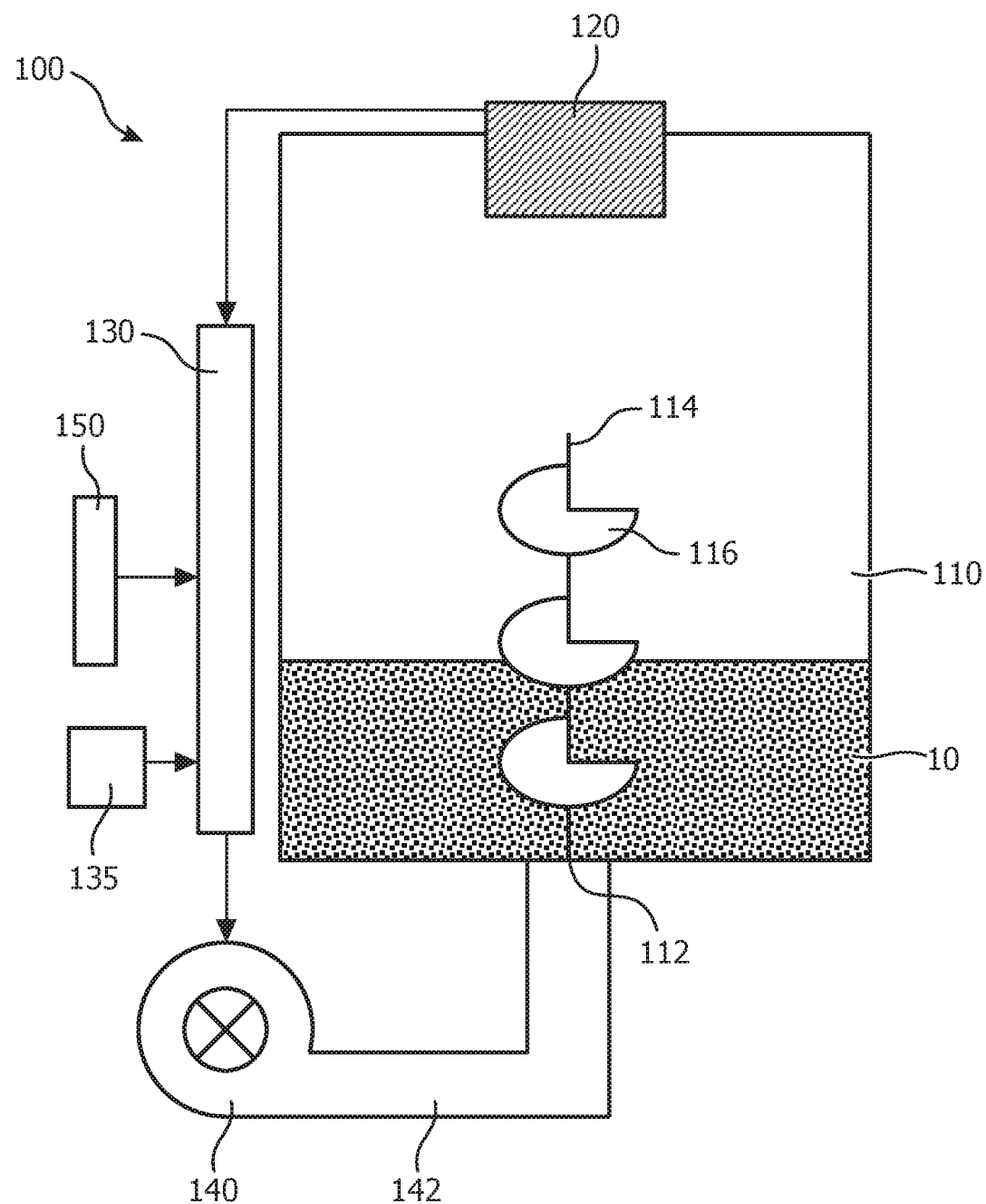
FIG. 1 schematically depicts a coffee roasting apparatus according to an embodiment.

It should be understood that the Figures are merely schematic and are not drawn to scale. It should also be understood that the same reference numerals are used throughout the Figures to indicate the same or similar parts.

In the context of the present invention, VOCs are organic compounds, that have a defined minimum vapour pressure at room temperature (298K or 25° C.), e.g. organic compounds having a boiling point of less than or equal to 250° C., e.g. a boiling point in the range of 50-250° C. The total concentration of VOCs may be the total concentration of all VOCs released by the coffee beans 10 that can be detected by a VOC sensor or alternatively may be the total concentration of a selection of VOCs released by the coffee beans 10 that can be detected by a VOC sensor, e.g. a VOC sensor capable of detecting said selection only.

FIG. 1 schematically depicts a coffee roasting apparatus 100 according to an embodiment. The coffee roasting apparatus 100 typically comprises a compartment 110 for storing coffee beans 10 therein. The compartment 110 may further comprise a stirring arrangement including stirring members, e.g. agitating blades, 116 mounted on or otherwise affixed to a stirring bar 114 to stir the coffee beans 10 during the roasting process of the coffee beans. This stirring arrangement assists in ensuring a homogeneous roasting of the coffee beans 10 in the compartment 110. The stirring arrangement may be controlled in any suitable manner, for instance by a controller 130, which will be explained in further detail below.

The coffee roasting apparatus 100 typically further comprises a roasting element (not shown) for roasting the coffee beans 10 in the compartment 110. The coffee roasting apparatus 100 further comprises a heating arrangement 140 for heating the coffee beans 10 during the roasting process. In an embodiment, the heating arrangement 140 may be controlled by the controller 130. The heating arrangement 140 ensures that the coffee beans 10 are heated to an appropriate temperature at which the roasting of the coffee beans 10 takes place, i.e. an appropriate temperature at which the desired chemical reactions such as the Maillard reaction and pyrolytic reactions take place. In FIG. 1, the heating arrangement 140 is embodied by a hot air generator connected to an inlet 112 of the compartment 110 via a conduit 142 by way of non-limiting example only. In this embodiment, the inlet 112 is typically arranged such that the hot air is guided through the coffee beans 10 during the roasting process, e.g. when stirring the coffee beans 10 using the stirring arrangement. The inlet 112 may comprise a fine grid or the like to prevent coffee beans 10 from entering the conduit 142.

However, it should be understood that any suitable heating arrangement for heating the coffee beans 10 may be used, such as one or more heating elements attached to or integrated into the one or more walls of the compartment 110, in which case the inlet 112 may be omitted. As such heating arrangements are well-known per se, they will not be explained in further detail for the sake of brevity only.

The controller 130 is adapted to control the heating arrangement at least partially in response to a change in the rate at which the coffee beans 10 residing in the compartment 110 release VOCs during the roasting process, e.g. the rate at which the total concentration of VOCs in the compartment 110 changes.

In an embodiment, in order to facilitate such a control mechanism, the coffee roasting apparatus 100 may comprise a VOC sensor 120 for detecting such a total concentration of the VOCs in the compartment 110. VOC sensors are well-known per se and are therefore not explained in further detail for the sake of brevity only. Any suitable VOC sensor may be used as the VOC sensor 120.

Figure 2:
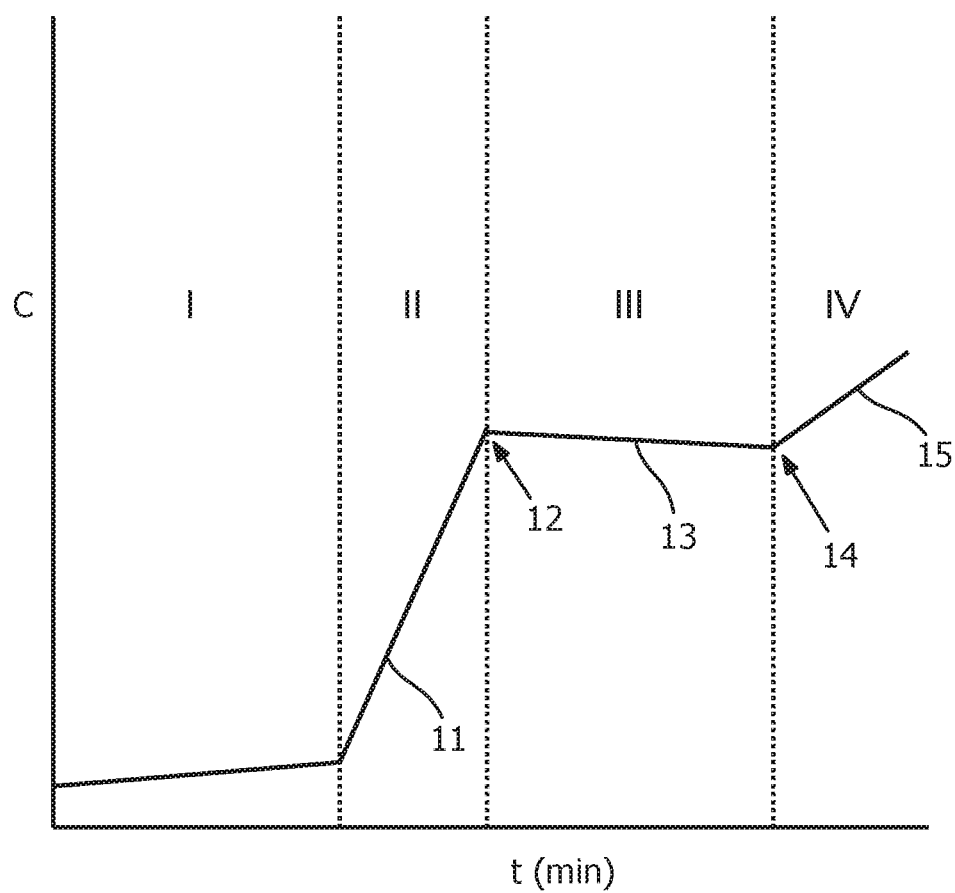
FIG. 2 schematically depicts an operating principle of the coffee roasting apparatus of FIG. 1.

The controller 130 may be adapted to control the heating arrangement 140 in response to the total VOC levels detected in the compartment 110 by the VOC sensor 120. In particular, the controller may be adapted to respond to an increase in the rate of change in concentration of VOCs released by the coffee beans 10 signalling the occurrence of the first cracking phase. This will be explained in more detail with the aid of FIG. 2, which schematically depicts a typical VOC release curve during a roasting process of coffee beans 10. The VOC release curve expresses the total concentration C of VOCs in the compartment 110 as a function of roasting time t. The curve can be divided into four distinct regions. The first region I is typically associated with the drying phase of the coffee beans 10, during which the VOCs concentration in the compartment 110 is typically close to zero, and may increase only slightly if at all until the coffee beans enter the first cracking phase identified by region II, in which the VOC concentration in the compartment 110 rapidly increases as indicated by segment 11 of the VOC release curve, i.e. the rate of change of the total VOC concentration increases. Upon completion of the first cracking phase as indicated by point 12 in the VOC release curve, the rate of increase of the total VOC concentration in the compartment 110 is significantly reduced and may reach a zero or even slightly negative value during the third region as indicated by segment 13 of the VOC release curve. This steady state in the total VOC concentration is typically maintained until the coffee beans 10 enter the second cracking phase identified by point 14 in the VOC release curve, which second cracking phase as identified by region IV of the VOC release curve is typically characterized by a marked increase in the total VOC concentration in the compartment 110.

This predictable behaviour may be utilized to control the coffee roasting process in a predetermined manner upon the occurrence of one or more of these reference points in the VOC release curve in order to improve the consistency and/or quality of the roasting process.

In an exemplary embodiment, the controller 130 is adapted to identify the start of the first cracking phase by monitoring the change in the total VOC concentration from the sensor readings provided by VOC sensor 120 in order to identify the start of the first cracking phase. The controller 130 may for instance compare the rate of change of the total VOC concentration against a defined threshold, and upon the rate of change of the total VOC concentration exceeding this defined threshold, the controller 130 may control the further roasting process in a predetermined manner, e.g. by controlling the heating arrangement 140 in a predetermined manner. This may for instance include controlling the heating temperature during the first cracking process of the coffee beans 10; during the first cracking process, the coffee beans 10 are subjected to exothermic reactions causing the internal temperature of the coffee beans 10 to rapidly increase, such that the amount of heat generated by the heating arrangement 140 may be reduced or otherwise controlled during the first cracking phase to avoid overheating, i.e. over roasting, of the coffee beans 10 during this phase.

In an exemplary embodiment, the controller 130 is adapted to identify the end of the first cracking phase as identified by reference point 12 by monitoring the change in the total VOC concentration from the sensor readings provided by VOC sensor 120 in order to identify the end of the first cracking phase. The controller 130 may for instance compare the rate of change of the total VOC concentration against a defined further threshold, here a negative threshold as the end of the first cracking is signalled by the coffee beans 10 slowing the release of VOCs, and upon the rate of change of the total VOC concentration exceeding this defined further threshold, i.e. the rate of change dropping below this further threshold, the controller 130 may control the further roasting process in a predetermined manner, e.g. by controlling the heating arrangement 140 by a predetermined amount of time to complete the roasting process. The predetermined amount of time may depend of a desired degree of roasting as specified by the user of the coffee roasting apparatus 100; different roasting degrees may be associated with different amounts of time required to complete the roasting process from the end of the first cracking phase, as will be readily understood by a person skilled in the art. The controller 130 may be adapted to control the first cracking process in a predetermined manner as previously explained and subsequently control the remainder of the roasting process in a predetermined manner following the completion of the first cracking process as explained above.

In an exemplary embodiment, the controller 130 is adapted to identify the start of the second cracking phase by monitoring the change in the total VOC concentration from the sensor readings provided by VOC sensor 120 in order to identify the start of the second cracking phase. The controller 130 may for instance compare the rate of change of the total VOC concentration against a defined threshold, and upon the rate of change of the total VOC concentration exceeding this defined threshold, the controller 130 may control the further roasting process in a predetermined manner, e.g. by controlling the heating arrangement 140 in a predetermined manner. The controller 130 may detect the start of the second cracking phase by first identifying the start of the first cracking phase and the end of the first cracking phase as previously explained, such that a subsequent increase in the rate at which the total concentration of the VOCs in the compartment 110 increases can be assigned to the start of the second cracking phase as indicated by point 14 in FIG. 2. For instance, the controller 130 may be adapted to continue the roasting process for a predetermined period of time and/or control the heating of the coffee beans 10 during the second cracking phase in a predetermined manner as previously explained in relation to the first cracking phase. The controller 130 of the coffee roasting apparatus 100 may be configured to control the roasting process in a predetermined manner as a function of the detection of the second cracking phase in scenarios in which a deep roast of the coffee beans 10 is required, as the second cracking phase is typically associated with such a deep roast. It is noted that the end of the second cracking phase is typically associated with a reduction in the rate of release of VOCs from the coffee beans 10, such that the controller 130 may further be adapted to detect the end of the second cracking phase by detecting this reduction, e.g. by comparing the rate of reduction with a predefined threshold, and may be further adapted to complete the roasting process in a predetermined manner, e.g. by a predetermined amount of time, following the detection of the end of the second roasting phase.

In an embodiment, the controller 130 may be adapted to select the appropriate reference point in the VOC release curve for controlling the roasting process in a predetermined manner from these reference point based on a user-specified desired roasting degree of the coffee beans 10. For instance, where a user has indicated that the desired roasting degree is a light roast, the controller 130 may be adapted to control the remainder of the roasting process in a predetermined manner upon detecting the completion of the first cracking phase as previously explained. Alternatively, where a user has indicated that a desired roasting degree is a dark roast, the controller 130 may be adapted to control the remainder of the roasting process in a predetermined manner upon detecting the start and/or completion of the second cracking phase as previously explained.

In an embodiment, the controller 130 may be adapted to engage the heating arrangement 140 for a set period of time upon completion of the first cracking process as detected by the aforementioned rate of total concentration changes in VOCs released by the coffee beans 10. The set period of time may correspond to a user-defined degree of roasting of the coffee beans 10, where a longer period of time typically corresponds to a darker roast of the coffee beans 10. To this end, the controller 130 may include or may have access to a non-volatile data storage element such as a ROM or Flash memory, look-up table or the like (not shown) in which a time period is defined as a function of roasting degree. The controller 130 may further include a timer 135 for controlling the heating arrangement in accordance with the set period of time. Alternatively, the timer 135 may be separate to the controller 130. As it is well-known per se to control a heating arrangement of coffee roasting apparatus 100 using time as a control parameter, this will not be explained in further detail for the sake of brevity only. It is simply noted that the time control aspect of the aforementioned embodiment may be implemented in any suitable manner.

The controller 130 may be responsive to a user interface 150, which for instance may facilitate a user specifying the desired roasting degree of the coffee beans 10 in any suitable manner, e.g. using a dial, a series of buttons, a programmable display, which may be a touch-screen display and so on. Any suitable type of user interface 150 may be used for this purpose.

It will be understood that these embodiments are non-limiting examples of possible arrangements and that many other arrangements are equally suitable; for instance, even though the embodiment of the coffee roasting apparatus 100 as shown in FIG. 1 has been explained using a discrete controller 130, it is equally feasible that at least some of the discrete components form part of a single arrangement. For instance, the controller 130 may form part of the VOC sensor 120 and so on.

In an example embodiment, the coffee roasting apparatus 100 may be further adapted to control the roasting process by determining the color of the coffee beans 10, for instance after completion of the first cracking phase of the coffee beans 10 as determined by the change in the aforementioned rate of total concentration changes in VOCs released by the coffee beans 10. To this end, a further sensor (not shown) may be present in the compartment 110, which further sensor is arranged to determine the colour of the coffee beans 10 in the compartment 110. The further sensor is communicatively coupled to the controller 130 such that the controller 130 can further control the heating arrangement of the coffee roasting apparatus 100 in response to the further sensor. As the process of coffee bean colour determination is well-known per se, this will not be explained in any further detail for the sake of brevity only. It is simply noted that any suitable coffee bean colour determination sensing arrangement may be used.

The coffee roasting apparatus 100 may be integrated in a coffee brewing apparatus further comprising a coffee bean grinder and a coffee brewing stage. For instance, the coffee brewing apparatus may be arranged to automatically transfer a portion of the roasted coffee beans into the coffee bean grinder for grinding, after which the ground coffee is automatically transported into the coffee brewing stage for brewing a fresh cup of coffee. As such coffee brewing apparatuses are well-known per se, this will not be explained in further detail for reasons of brevity only. It should be understood that the particular embodiment of such a coffee brewing apparatus is not critical to the present invention and that any suitable arrangement of such coffee brewing apparatus may be contemplated.

Figure 3:
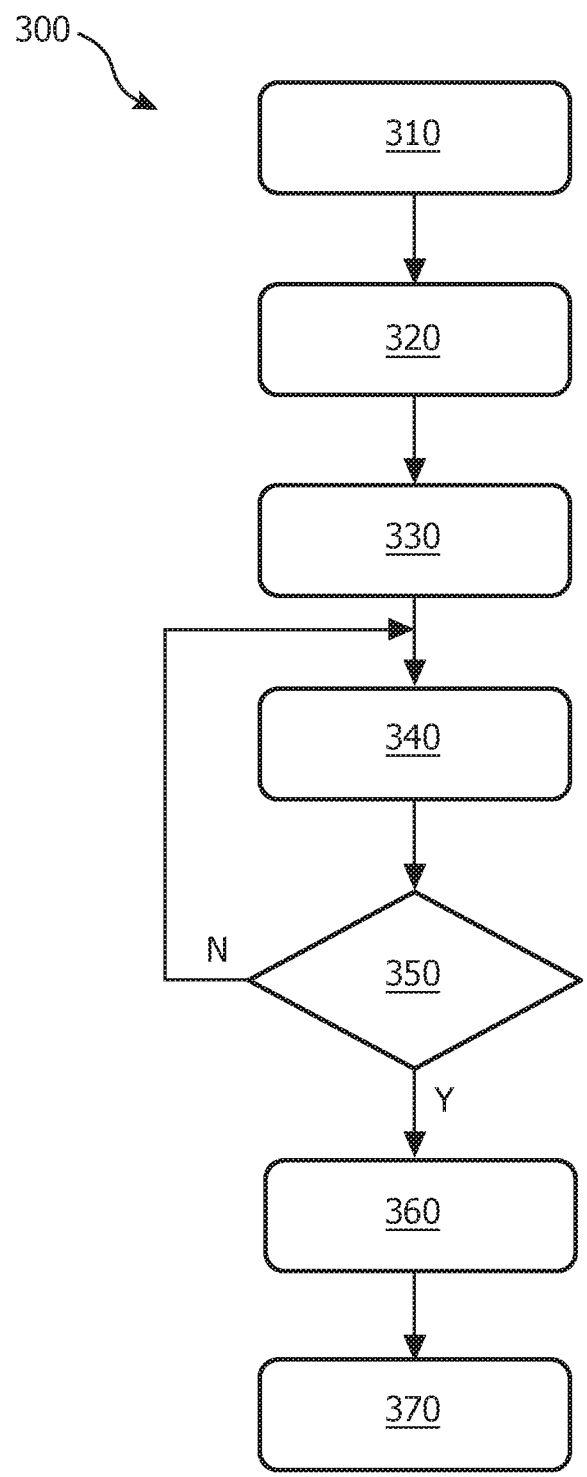
FIG. 3 schematically depicts a flowchart of a coffee roasting method according to an embodiment.

An example embodiment of the coffee brewing method 800 according to the present invention will now be explained in further detail with the aid of FIG. 3, which depicts a flowchart of this example embodiment. The method starts in step 310 for instance with the switching on of the coffee roasting apparatus 100 and/or the filling of the compartment 110 with the coffee beans 10 to be roasted. The method then proceeds to step 320 in which a user defines the desired roasting level of the coffee beans 10, for instance using the user interface 150.

In step 330, the roasting process of the coffee beans 10 is engaged by enabling the heating arrangement 140, during which roasting process the total concentration of VOCs released by the coffee beans 10 is monitored by the VOC sensor 120 and interpreted by the controller 130 in step 340 in order to detect a reference point of interest during the roasting process, such as the beginning or end of the first cracking phase, the beginning or end of the second cracking phase and so on. It will be understood that although step 340 is shown as following step 330, step 340 is typically executed in parallel with step 330.

The method then proceeds to step 350 in which the controller 130 checks if the rate of change in the total concentration of VOCs released by the coffee beans 10 exceeds a predefined threshold as previously explained. If this is not the case, the method returns to step 340 and the monitoring is continued. However, if the controller determines that this rate of change has exceeded the predefined threshold, the method proceeds to step 360 in which the roasting process is continued in a predetermined manner, for instance by controlling the heat input into the coffee beans 10 during first cracking and/or by completing the roasting process in a predetermined amount of time, during which the heat input into the coffee beans 10 may be varied (in a predetermined manner) if necessary, which predetermined amount of time may be selected based on a user-specified desired roasting degree of the coffee beans 10 as previously explained. Once the coffee beans 10 have been roasted in this manner, the method terminates in step 370.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements. The invention can be implemented by means of hardware comprising several distinct elements. In the device claim enumerating several means, several of these means can be embodied by one and the same item of hardware. The mere fact that certain measures are recited in mutually different dependent claims does not indicate that a combination of these measures cannot be used to advantage.

The invention claimed is:

1. A coffee roasting apparatus comprising:
a compartment for holding coffee beans;
a heating arrangement for heating the coffee beans in said compartment during a roasting process of the coffee beans;
a volatile organic compound sensor for determining a total concentration of volatile organic compounds residing in said compartment; and
a controller for controlling the heating arrangement, wherein the controller is adapted to:
  determine whether a rate of change in said total concentration of volatile organic compounds residing in said compartment exceeds a predefined threshold; and
  control the heating arrangement based on a determination that said rate of change in said total concentration of volatile organic compounds residing in the compartment exceeds the predefined threshold.

2. The coffee roasting apparatus of claim 1, wherein the controller is adapted to control the heating arrangement in response to inputs from the volatile organic compound sensor.

3. The coffee roasting apparatus of claim 1, wherein said rate of change exceeding the predefined threshold is indicative of a start of a first cracking phase of said coffee beans.

4. The coffee roasting apparatus of claim 1, wherein said rate of change exceeding the predefined threshold is indicative of an end of a first cracking phase of said coffee beans.

5. The coffee roasting apparatus of claim 1, wherein said rate of change exceeding the predefined threshold is indicative of a start of a second cracking phase of said coffee beans.

6. The coffee roasting apparatus of claim 1, wherein the controller is adapted to control the roasting process in a predetermined manner after said rate of change exceeding the predefined threshold.

7. The coffee roasting apparatus of claim 6, wherein the controller is adapted to control the heating arrangement in the predetermined manner by enabling the heating arrangement for a predefined time period.

8. The coffee roasting apparatus of claim 7, further comprising a timer, wherein the controller is responsive to said timer for enabling the heating arrangement for the predefined time period.

9. The coffee roasting apparatus of claim 1, further comprising a user interface for defining a degree of roasting of the coffee beans, the controller being responsive to the user interface.

10. The coffee roasting apparatus of claim 1, wherein:
the compartment comprises an inlet;
the heating arrangement comprises a hot air source coupled to said inlet; and
the coffee roasting apparatus further comprises a stirring element mounted in said compartment for stirring the coffee beans during the roasting process.

11. A coffee brewing apparatus including the coffee roasting apparatus of claim 1.

* * * * *